(12) United States Patent
Kim et al.

(10) Patent No.: US 8,446,936 B2
(45) Date of Patent: May 21, 2013

(54) CO-CHANNEL FEEDBACK SIGNAL CANCELLING REGENERATIVE REPEATER OF ADVANCED TELEVISION SYSTEM COMMITTEE

(75) Inventors: Yong-Soek Kim, Daejeon (KR); Sang-Gee Kang, Daejeon (KR); Young-Woo Suh, Seoul (KR)

(73) Assignees: Darbs Co., Ltd. (KR); Korean Broadcasting System (KR)

( * ) Notice: Subject to any disclaimer, the term of this patent is extended or adjusted under 35 U.S.C. 154(b) by 462 days.

(21) Appl. No.: 12/733,691

(22) PCT Filed: Apr. 17, 2009

(86) PCT No.: PCT/KR2009/002007
§ 371 (c)(1),
(2), (4) Date: Mar. 15, 2010

(87) PCT Pub. No.: WO2009/128674
PCT Pub. Date: Oct. 22, 2009

(65) Prior Publication Data
US 2010/0194987 A1 Aug. 5, 2010

(30) Foreign Application Priority Data

Apr. 18, 2008 (KR) .................. 10-2008-0036150
Nov. 24, 2008 (KR) .................. 10-2008-0116826

(51) Int. Cl.
*H04B 1/38* (2006.01)
(52) U.S. Cl.
USPC ........... 375/220; 375/211; 375/229; 375/230; 375/231; 375/232; 375/233; 375/260; 375/285; 375/316; 375/350
(58) Field of Classification Search
USPC ................. 375/211–223, 350, 260, 285
See application file for complete search history.

(56) References Cited

U.S. PATENT DOCUMENTS
2006/0019603 A1   1/2006   Pergal

FOREIGN PATENT DOCUMENTS
| EP | 1087559 A1 | 3/2001 |
|---|---|---|
| EP | 1617572 A1 | 1/2006 |
| WO | WO-2006/115320 A1 | 11/2006 |
| WO | WO 2006115320 A1 * | 11/2006 |
| WO | WO-2007/078032 A1 | 7/2007 |
| WO | WO 2007078032 A1 * | 7/2007 |

OTHER PUBLICATIONS

"International Application Serial No. PCT/KR2009/002007, International Search Report mailed Apr. 1, 2010", 5 pgs.

* cited by examiner

*Primary Examiner* — Ted Wang
*Assistant Examiner* — Janice Tieu
(74) *Attorney, Agent, or Firm* — Schwegman Lundberg & Woessner, P.A.

(57) ABSTRACT

Disclosed is a co-channel feedback signal cancelling regenerative repeater of the Advanced Television Systems Committee (ATSC) that extracts a predetermined reference value of feedback signal to be able to cancel the feedback signal among received signals, including: a signal receiving unit; a signal demodulating unit that converts frequency of a received signal and demodulates it into a baseband signal; an interference equalizing unit that corrects characteristics of the demodulated signal and cancels feedback signal; a channel equalizing unit that compensates for channel distortion of an original signal from which the feedback signal is cancelled; a modulating unit that modulates the channel distortion-compensated original signal and converts it into an analog signal; and a signal transmitting unit that converts the frequency of the modulated signal, controls and amplifies its gain, and transmits a regenerative transmission signal.

7 Claims, 6 Drawing Sheets

[Fig. 1]

(Prior Art)

CO-CHANNEL FEEDBACK SIGNAL CANCELLING REGENERATIVE REPEATER OF ADVANCED TELEVISION SYSTEM COMMITTEE

CROSS REFERENCE TO RELATED APPLICATION

This application is a nationalization under 35 U.S.C. 371 of PCT/KR2009/002007, filed Apr. 17, 2009 and published as WO 2009/128674 A2 on Oct. 22, 2009, which application claims priority to and the benefit of Korean Patent Application No. 10-2008-0036150, filed Apr. 18, 2008; Korean Patent Application No. 10-2008-0116826, filed Nov. 24, 2008, which applications and publication are incorporated herein by reference and made a part hereof.

TECHNICAL FIELD

The present invention relates to a co-channel feedback signal cancelling regenerative repeater, and more specifically, to a co-channel feedback signal cancelling regenerative repeater of the Advanced Television Systems Committee (ATSC), which can improve feedback signal cancelling efficiency by estimating and cancelling the feedback signal among signals received in a receiving antenna with a predetermined reference value while simultaneously solving restrictive conditions, such as a setting distance between a receiving antenna and a transmitting antenna, upon installing.

BACKGROUND ART

A repeater has been used to achieve objects such as improving quality of broadcasting services, satisfying broadcasting standards, and extending a radio wave radius when repeating a radio wave of a high frequency band.

Further, in the case of shadow regions such as a tunnel, with an underground roadway radio where a radio wave of a transferred signal is weak, the repeater has been used to amplify the weak signal.

The repeater is subdivided into a varied wave type, a non-varied wave type, an optical type, a microwave type, and the like. In the case of the non-varied wave type of repeater, it can amplify and transceive the co-channel signal while reducing the magnitude as a whole, such that an available range of a frequency band can be extended and a waste of installation space can be prevented. As a result, the non-varied wave type of repeater has widely been used in radio communication.

Figure 1:
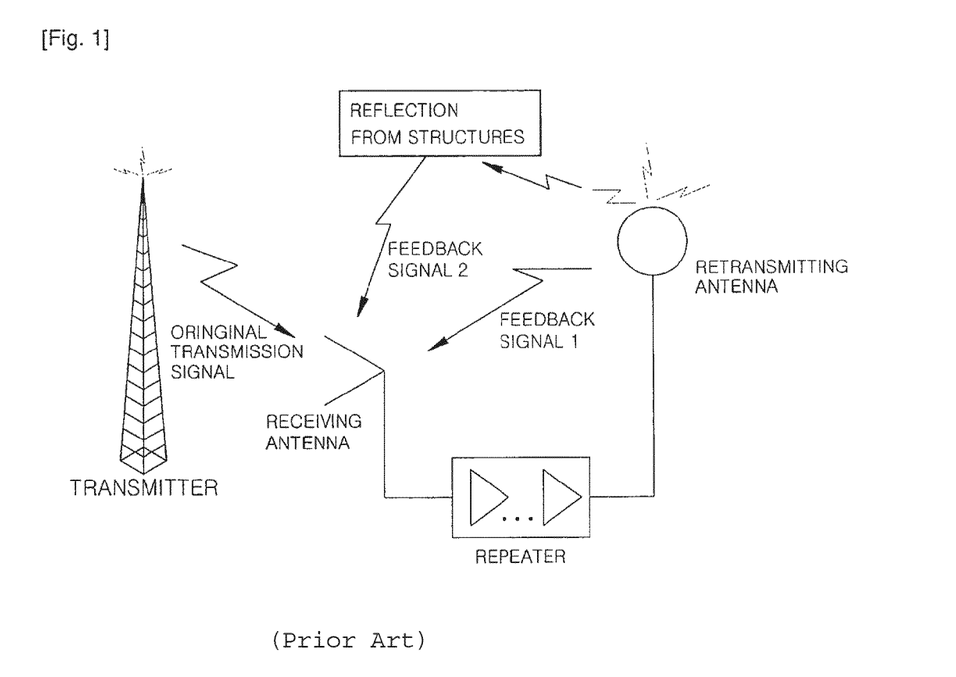
FIG. 1 is a schematic view showing various paths of co-channel feedback signal in a regenerative repeater in the related art.

However, in the non-varied wave type of repeater in the related art, since an antenna for receiving a signal and an antenna for transmitting a signal are provided in a single body as shown in FIG. 1, it has a problem in causing oscillation due to signals that are transmitted from the transmitting antenna and then fed back to the receiving antenna, that is, feedback signal.

The oscillation degrades performance of devices, causes a failure, and increases maintenance costs. Moreover, since the oscillation degrades the quality of repeated signals, when the non-varied wave type of repeater is applied to broadcast repeating that should simultaneously transfer voice and video signals, they become main factors of degrading the repeating performance.

In order to solve the above problems, the non-varied wave type of repeater in the related art has adopted a type where a unit that is capable of cancelling the feedback signal is provided.

However, most cancelling units are configured as a type that discriminates a signal to be received through the receiving antenna, that is, an original signal to be repeated, and removes feedback signal and then compares the magnitude thereof to cancel a signal having a small magnitude.

Therefore, the feedback signal cancelling unit of the non-varied wave type of repeater in the related art of the above-mentioned type has a limitation in improving the repeating performance only within the range of satisfying the precondition where the magnitude of the feedback signal should be smaller than that of the original signal.

Thereby, in the related art, the non-varied wave repeater as well as a varied wave type repeater was used.

However, the varied wave type repeater, which adopts a scheme that simply makes frequencies of input and output signals different to prevent the feedback signal from being received, has a problem in that it should extend the range of the frequency band required for the system as a whole.

In other words, the varied wave type of repeater does not solve fundamental problems in that it is difficult to improve operating efficiency and to reduce costs consumed for installation or maintenance In particular, in the case of the non-varied wave repeater and the varied wave repeater in the related art, the regeneration of the repeated signals cannot be expected since they simply amplify and repeat the signals received from the transmitter.

Therefore, they have problems in that they are not suitable for repeating the broadcasting signals that require a high quality of broadcasting standards.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention proposes to solve the above problems. An object of the present invention is to provide a co-channel feedback signal cancelling regenerative repeater of the Advanced Television Systems Committee (ATSC), which can effectively cancel feedback signal among received signals regardless of a magnitude of the feedback signal with respect to an original signal by extracting a predetermined reference value of feedback signal from a regenerative transmission signal of a signal transmitting unit and cancelling the feedback signal.

Another object of the present invention is to provide a co-channel feedback signal cancelling regenerative repeater of the Advanced Television Systems Committee (ATSC), which can provide stability of operation while simultaneously improving convenience of installation by removing restrictive conditions, such as a setting distance between a receiving antenna and a transmitting antenna.

A further object of the present invention is to provide a co-channel feedback signal cancelling regenerative repeater of the Advanced Television Systems Committee (ATSC), which can facilitate installation and maintenance as well as improve operating efficiency of a frequency applied to the repeating.

Technical Solution

An embodiment of the present invention provides a co-channel feedback signal cancelling regenerative repeater of the ATSC including: a signal receiving unit; a signal demodulating unit that converts frequency of a received signal and demodulates it into a baseband signal; an interference equalizing unit that corrects characteristics of the demodulated signal and cancels feedback signal; a channel equalizing unit that compensates for channel distortion of an original signal from which the feedback signal is cancelled; a modulator that modulates the channel distortion-compensated original signal and converts it into an analog signal; and a signal transmitting unit that converts the frequency of the modulated signal, controls and amplifies its gain, and transmits a regenerative transmission signal. The signal demodulating unit is configured to include a coupling that hands over the regenerative transmission signal of the signal transmitting unit separately from a system linked with the signal receiving unit, thereby making it possible to convert and demodulate the frequency of the regenerative transmission signal, and the interference equalizing unit is configured to estimate a reference value of feedback signal from the demodulated regenerative transmission signal, thereby making it possible to remove the feedback signal among the received signals.

Further, the interference equalizing unit includes: a first sampling time control unit and a second sampling time control unit that are provided to correspond to the received signal and the regenerative transmission signal, respectively, that are handed over from the demodulating unit; a first matching filter and a second matching filter that extracts the sampled received signal and the regenerative transmission signal from the baseband signal; a first DC remover and a second DC remover that are linked with the first matching filter and the second matching filter, respectively, and that eliminate pilots of the received signal and the regenerative transmission signal; a first adaptive filter that hands over the regenerative transmission signal from which the pilot is eliminated and then takes over the magnitude and phase parameter of the feedback signal according to the regenerative transmission signal from which the pilot is eliminated, thereby cancelling the feedback signal among the received signals from which the pilot is eliminated; an feedback signal estimator that takes over the regenerative transmission signal from which the pilot is eliminated by the first adaptive filter and estimates the magnitude and phase parameter of the feedback signal; a first signal magnitude adjuster that takes over the original signal remaining by cancelling the feedback signal among the received signals from which the pilot is eliminated by the first adaptive filter and then corrects a symbol magnitude of the original signal; a timing synchronizer that extracts the timing control variables from the original signal output from the first signal magnitude adjuster and hands them over to the first sampling time control unit and the second sampling time control unit; a second adaptive filter that takes over the received signal and the regenerative transmission signal extracted from the first matching filter and the second matching filter and takes over the magnitude and phase parameter of the feedback signal estimated from the feedback signal estimator to cancel the feedback signal from the received signal from which the pilot is not eliminated, thereby extracting the original signal in the state where the pilot is not eliminated; a second signal magnitude adjuster that takes over the original signal in the state where the pilot is not eliminated by the second adaptive filter and corrects the symbol magnitude of the original signal; and a frequency synthesizer that is configured to extract frequency control variables of a carrier from the original signal that is corrected by the second signal magnitude adjuster and to apply them to the received signal and the regenerative transmission signal, respectively.

The interference equalizing unit can also be utilized as a type where the first sampling time control unit and the second timing controller are omitted. At this time, the timing synchronizer is configured to be linked with a VCXO machine that controls the sampling by voltage so that the timing control variables can be applied to a first AD converter and a second AD converter of the signal demodulating unit, respectively.

Furthermore, the modulator can be utilized by being able to apply the timing control variables and the frequency control variables extracted from the timing synchronizer and the frequency synchronizer to the regenerative transmission signal.

At this time, the regenerative transmission signal can be subjected to inverse-compensation from the timing control variables and the frequency control variables.

Advantageous Effects

With the co-channel feedback signal cancelling regenerative repeater of the ATSC according to the present invention, a configuration is adopted that extracts the predetermined reference value of the feedback signal from the regenerative transmission signal of the signal transmitting unit to cancel the feedback signal, thereby making it possible to effectively cancel the feedback signal among the received signals regardless of the magnitude of the feedback signal with respect to the original signals.

In addition, the co-channel feedback signal cancelling regenerative repeater of the ATSC according to the present invention improves the quality of a repeating broadcast and the operating stability, and prevents a failure due to oscillation, etc., thereby being economical such as by reducing the maintenance costs required for the entire apparatus.

Further, with the co-channel feedback signal cancelling regenerative repeater of ATSC according to the present invention, the output of the regenerative transmission signal can be controlled such that the operating efficiency of the frequency can be improved upon repeating.

BEST MODE FOR CARRYING OUT THE INVENTION

Hereinafter, a technical configuration of a co-channel feedback signal cancelling regenerative repeater of the ATSC according to exemplary embodiments of the present invention will be described in detail with reference to the accompanying drawings.

Figure 2:
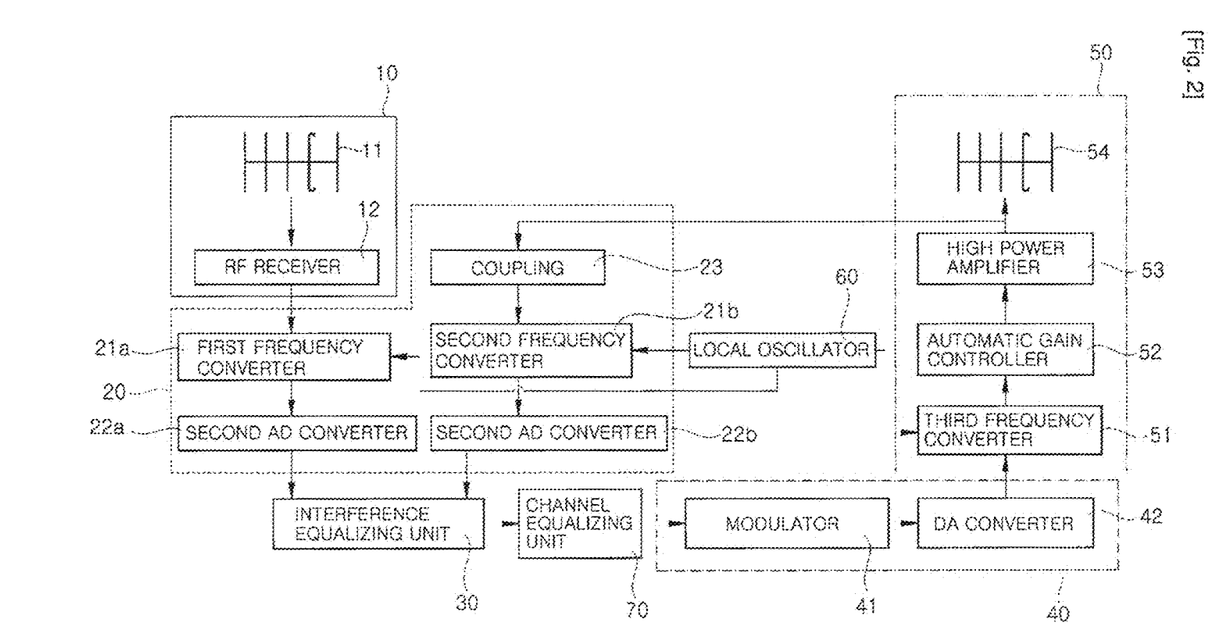
FIG. 2 is a block diagram showing a first exemplary embodiment of a co-channel feedback signal cancelling regenerative repeater of the ATSC according to the present invention.

First, the co-channel feedback signal cancelling regenerative repeater of the ATSC according to the present invention is configured to include a signal receiving unit 10, a signal demodulating unit 20, an interference equalizing unit 30, a channel equalizing unit 70, a modulating unit 40, and a signal transmitting unit 50, as shown in FIG. 2.

The signal receiving unit 10 is configured to be able to receive a desired band of radio waves. For example, the signal receiving unit 10 can be variously implemented as a type that includes a receiving antenna 11 and an RF receiver 12, and the like.

The signal demodulating unit 20 converts the frequency of the received signal and demodulates it into a baseband signal, and specifically, is configured to include a coupling 23 that hands over the regenerative transmission signal from the signal transmitting unit 50 separately from the system linked with the signal receiving unit making it possible to convert and demodulate the frequency of the regenerative transmission signal.

In other words, the signal demodulating unit 20 may be configured to include a first frequency converter 21a that is linked with the RF receiver 12 of the signal receiving unit 10, a second frequency converter 21b that is linked with the coupling 23 connected with an output end of the signal transmitting unit 50 by a wire in addition to a first AD converter 22a, and a second AD converter 22b that is connected with the second frequency converter 21b to hand over the signal.

At this time, the first frequency converter 21a and the second frequency converter 21b are configured to be able to be linked with a predetermined local oscillator 60, thereby making it possible to improve accuracy at the time of converting the frequency of the corresponding signal.

Further, the first frequency converter 21a and the second frequency converter 21b are configured to down-convert the corresponding signal, that is, the signal handed over from the RF receiver 12 of the signal receiving unit and convert the frequency of the regenerative transmission signal handed over from the signal transmitting unit 50 into a predetermined baseband signal.

The interference equalizing unit 30 corrects characteristics of each signal that is demodulated by the signal demodulating unit 20 and cancels the predetermined feedback signal. In particular, the interference equalizing unit 30 is configured to estimate a reference value of the feedback signal from the demodulated regenerative transmission signal and to cancel the feedback signal included among the received signals from the estimated reference value.

Figure 3:
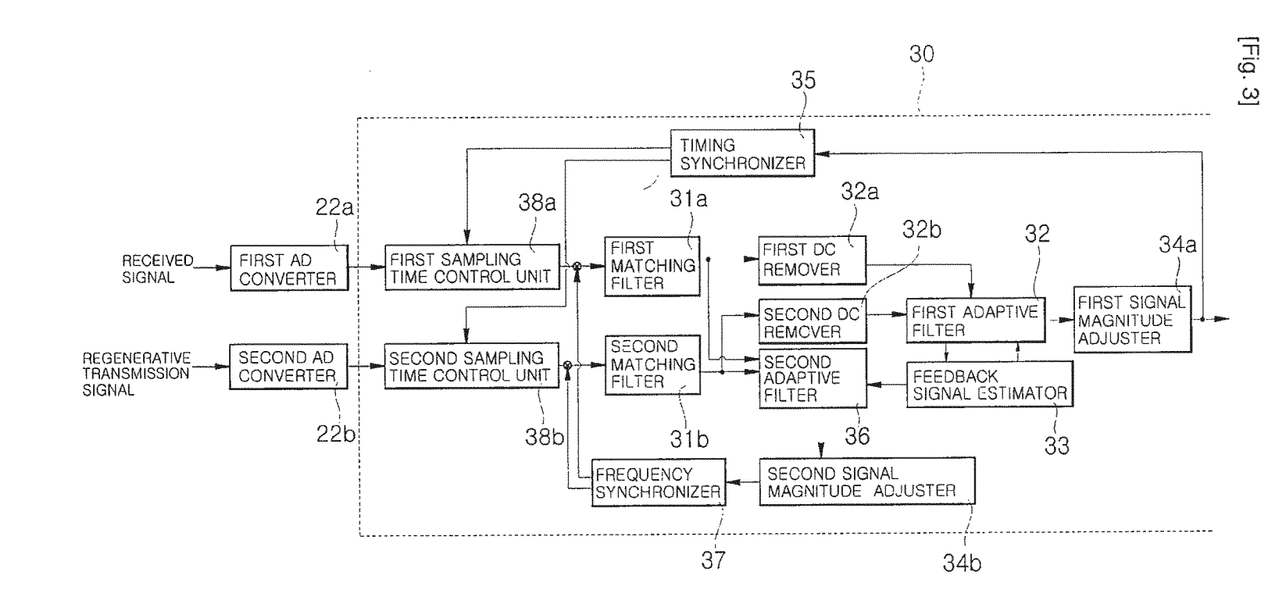
FIG. 3 is a block diagram showing a first exemplary embodiment of an interference equalizing unit in the co-channel feedback signal cancelling regenerative repeater of the ATSC according to the present invention.

For example, the interference equalizing unit 30 may include: a first sampling time control unit 38a and a second sampling time control unit 38b; a first matching filter 31a and a second matching filter 31b; a first DC remover 32a and a second DC remover 32b; a first adaptive filter 32; an interference signal estimator 33; a first signal magnitude adjuster 34a; a timing synchronizer 35; a second adaptive filter 36; a second signal magnitude adjuster 34b; and a frequency synchronizer 37, as shown in FIG. 3.

The first sampling time control unit 38a and the second sampling time control unit 38b are provided to correspond to the received signal and the regenerative transmission signal, respectively, handed over from the signal demodulating unit 20.

Further, the interference equalizing unit is configured to be able to take over timing control variables of original signals from the timing synchronizer 35 and extract the received signal demodulated by the signal demodulating unit 20 through the signal receiving unit 10 and the sampling of the regenerative transmission signal demodulated by the signal demodulating unit 23 through the coupling 23 from the output end of the signal transmitting unit 50.

The first matching filter 31a and the second matching filter 31b are respectively configured to correspond to the first sampling time control unit 38a and the second sampling time control unit 38b. The first matching filter 31a and the second matching filter 31b are configured to be able to extract the sampled received signal and regenerative transmission signal from a baseband signal.

The first DC remover 32a and the second DC remover 32b are respectively configured to connect with the output ends of the first matching filter 31a and the second matching filter 31b, thereby making it possible to eliminate the pilots of the received signal and the regenerative transmission signal handed over from the first matching filter 31a and the second matching filter 31b.

The first adaptive filter 32 is configured to be linked with the first DC remover 32a and the second DC remover 32b, and at the same time, to be connected with the feedback signal estimator 33.

In other words, the first adaptive filter 32 is configured to hand over the regenerative transmission signal from which the pilot is eliminated among the signals handed over from the first DC remover 32a and the second DC remover 32b to the feedback signal estimator 33 and take over the magnitude and phase parameter of the feedback signal from the feedback signal estimator 33 to cancel the feedback signal among the received signal from which the pilot is eliminated.

The feedback signal estimator 33 is configured to be linked with the first adaptive filter 32, thereby making it possible to estimate and extract the magnitude and phase parameter of the feedback signal from the regenerative transmission signal from which the pilot is eliminated, and handed over from the first adaptive filter 32.

Further, the interference estimator 33 is configured to hand over the reference value of the estimated feedback signal, that is, the magnitude or the phase parameter, to the first adaptive filter 32 and the second adaptive filter 36 to be able to be applied at the time of cancelling the interference signal.

From the above-mentioned technical configuration, the co-channel feedback signal cancelling regenerative repeater of the ATSC shows technical features of effectively cancelling the feedback signal among the received signals regardless of the magnitude of the feedback signal with respect to the magnitude of the received signal.

The first signal magnitude adjuster 34a is configured to connect to another output end of the first adaptive filter 32 to take over the original signal by offsetting the interference signal among the received signal from which the pilot is eliminated by the first adaptive filter 32, and performs a function of correcting the symbol magnitude of the original signal.

The timing synchronizer 35 is configured to connect to the output end of the first signal magnitude adjuster 34a and extract the timing control variables from the original signal whose symbol magnitude is adjusted.

Further, the timing synchronizer 35 hands over the extracted timing control variables to the first sampling time control unit 38a and the second sampling time control unit 38b, respectively, thereby making it possible to apply them to the sampling of the received signal and the regenerative transmission signal that are linked in the signal demodulating unit 20.

The second adaptive filter 36 is configured to be linked with the first matching filter 31a and the second matching filter 31b as well as the feedback signal estimator 33. In other words, the timing synchronizer 35 is configured to take over the received signal and the regenerative transmission signal from the first matching filter 31a and the second matching filter 31b and the magnitude and phase parameter of the feedback signal from the feedback signal estimator 33. From the above configuration, the second matching filter 36 cancels the feedback signal among the received signal from which the pilot is not eliminated, thereby making it possible to extract the original signal in the state where the pilot is not eliminated.

The technical configuration of the present invention as described above, that is, the second matching filter 36, shows the technical features of solving the problem that the inverse estimation cannot be converged only by the first adaptive filter 32 due to the pilots existing on the received signal and the reference signal of the feedback signal, respectively.

Further, the second signal magnitude adjuster 34b is configured to connect to the output end of the second matching filter 36, thereby making it possible to correct the symbol magnitude of the original signal in the state where the pilot handed over from the second matching filter 36 is not cancelled.

The frequency synchronizer 37 is configured to be linked with the second signal magnitude adjuster 34b, thereby making it possible to extract the frequency control variables of the carrier from the original signal from which the pilot having the symbol magnitude corrected by the second signal magnitude adjuster 34b is not cancelled as well as to apply the extracted frequency control variables to the received signal and the regenerative transmission signal handed over from the signal demodulating unit 20.

Figure 4:
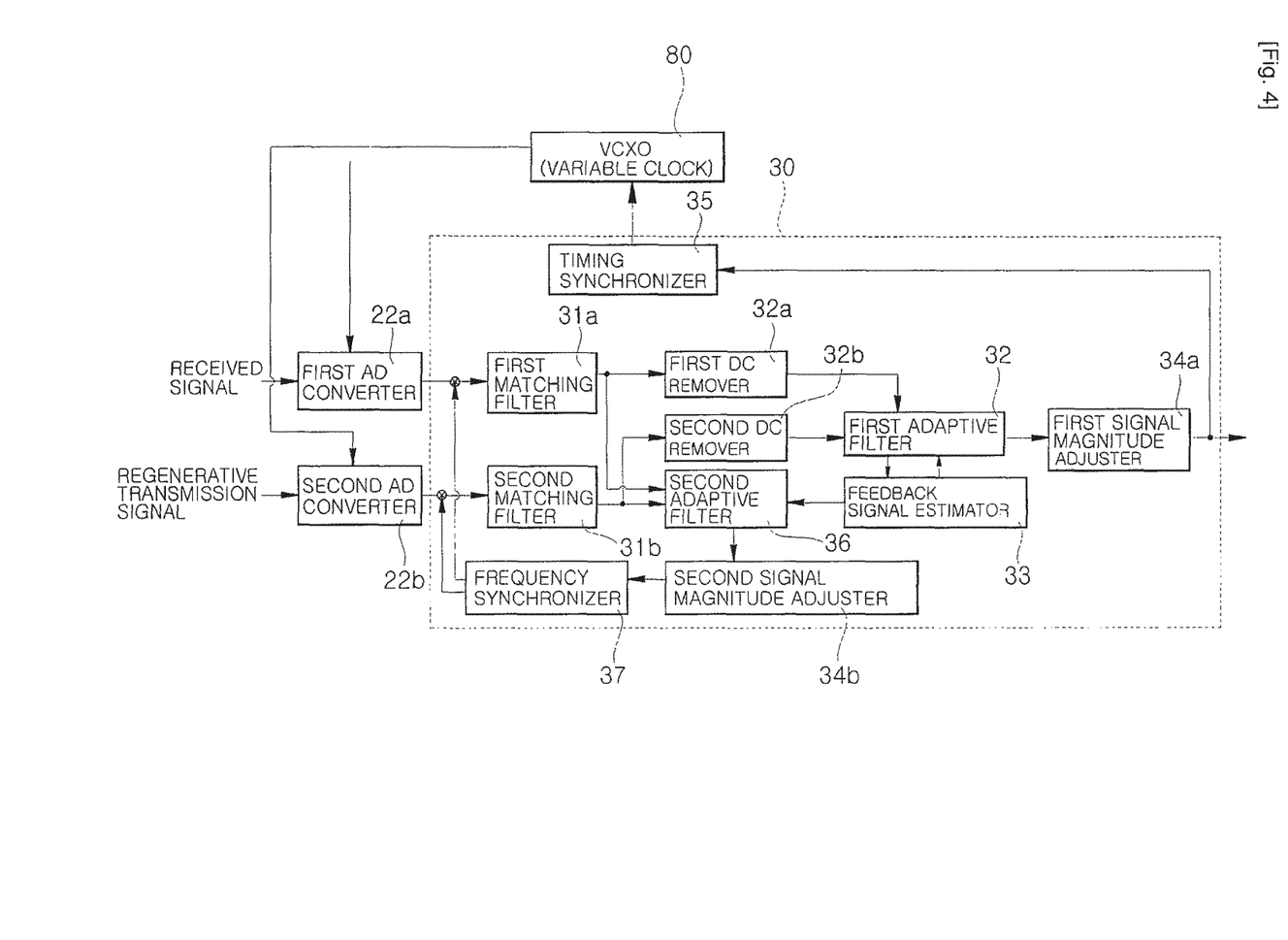
FIG. 4 is a block diagram showing a second exemplary embodiment of an interference equalizing unit in the co-channel feedback signal cancelling regenerative repeater of the ATSC according to the present invention.

Meanwhile, the interference equalizing unit 30 can be implemented as a type where the first sampling time control unit 38a and the second sampling time control unit 38b are omitted, as shown in FIG. 4. In other words, the interface equalizer 30 can be implemented as a type that includes the first matching filter 31a and the second matching filter 31b, the first DC remover 32a and the second DC remover 32b, the first matching filter 32, the feedback signal estimator the first signal magnitude adjuster 34a, the timing synchronizer 35, the second matching filter 36, the second signal magnitude adjuster 34b, and the frequency synchronizer 37, as described in the exemplary embodiment of FIG. 3.

Unlike the exemplary embodiment of FIG. 3, the first matching filter 31a and the second matching filter 31b are configured to correspondingly connect to the first AD converter 22a and the second AD converter 22b of the signal demodulating unit 20, respectively, thereby making it possible to take over the received signal and the regenerative transmission signal, respectively, and extract them from the baseband signal.

Further, the timing synchronizer 35 is configured to be linked with a VCXO machine 80 controlling the sampling by voltage so that the timing control variables can be applied to the first AD converter 22a and the second AD converter 22b of the signal demodulating unit respectively.

The first AD converter 22a and the second AD converter 22b of the signal demodulating unit 20 exhibit the technical features of performing the sampling while simultaneously converting the received signal and the regenerative transmission signal.

Further, the frequency synchronizer 37 is configured to maintain the frequency synchronization of the received signal and the regenerative transmission signal by reflecting the frequency control variable of the extracted original signal simultaneously with the output from the signal demodulating unit 20

Figure 5:
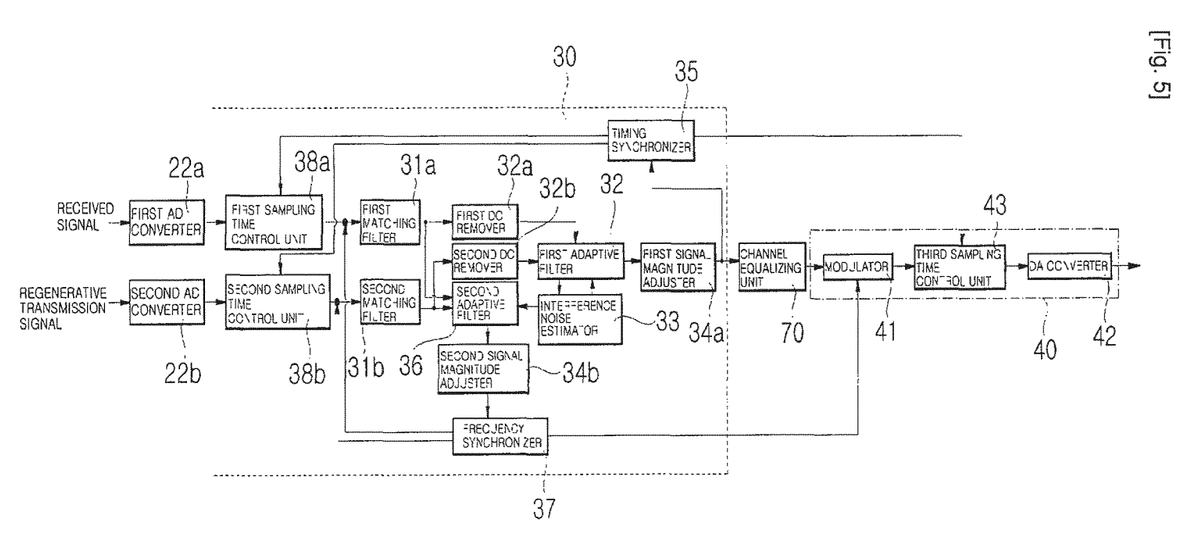
FIG. 5 is block diagram showing another embodiment of FIG. 3 in the co-channel feedback signal cancelling regenerative repeater of the ATSC according to the present invention.
Figure 6:
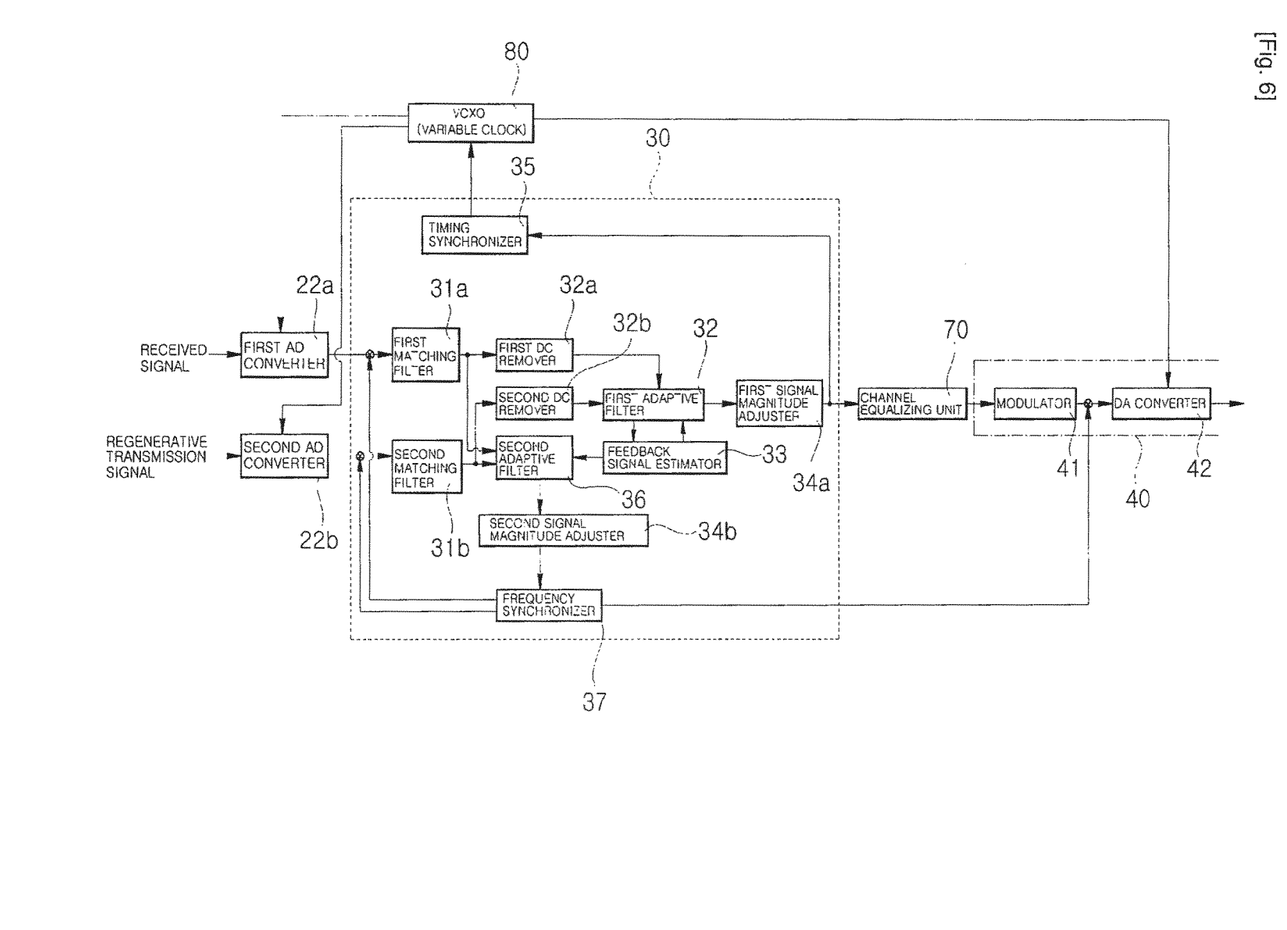
FIG. 6 is block diagram showing another embodiment of FIG. 4 in the co-channel feedback signal cancelling regenerative repeater of the ATSC according to the present invention.

As shown in FIGS. 5 and 6, it is preferable that the timing synchronizer 35 and the frequency synchronizer 37 of the present invention can perform inverse compensation on the timing or frequency of the regenerative transmission signal by applying the timing control variable and the frequency control variable of the original signal to the regenerative transmission signal of the modulating unit 40, respectively.

For example, as shown in FIG. 5, the timing synchronizer 35 and the frequency synchronizer 37 may include a type where the modulating unit 40 further includes the third sampling time control unit 43 to hand over the timing control variables extracted from the timing synchronizer 35, thereby performing the inverse compensation on the timing of the regenerative transmission signal modulated through the modulator 41 of the modulation unit 40 and the inverse compensation on the frequency from the frequency synchronizer 37.

Further, as shown in FIG. 6, the timing synchronizer 35 and the frequency synchronizer 37 may be variously implemented as a type where the frequency synchronizer 37 is linked with the regenerative transmission signal output from the modulator 41 of the modulating unit 40 to perform the inverse compensation on the frequency and the VCXO machine 80 is linked with the DA converter 42 of the modulating unit 40 to simultaneously perform the inverse compensation on the conversion and timing of the regenerative transmission signal.

As described above, in the case where the inverse compensation of the timing and frequency of the regenerative transmission signal can be performed, the quality during the repeating over the co-channel can be improved by performing the inverse compensation on the increase and decrease in the predetermined output such as the distortion compensation of the original signal of the channel equalizing unit 70.

The channel equalizing unit 70 is configured to be able to estimate the received signal from which the feedback signal is removed, that is, the receiving channel of the original signal, and compensate for the distortion. From this, the present invention shows the technical features as the regenerative repeater of satisfying the broadcasting quality and the broadcasting standards.

The modulating unit 40 is to modulate the distortion-compensated signal from which the feedback signal is cancelled before transmission, and may be configured to include the predetermined modulator 41 and the DA converter 42 converting the distortion-compensated digital signal into the analog signal and regenerating it.

The signal transmitting unit 50 is configured to be able to back convert the frequency of the modulated signal, control and amplify its gain, and repeat it through the transmitting antenna 54.

At this time, the signal transmitting unit 50 is configured to include a third frequency converter 51 linked with the DA converter 42, an automatic gain controller 52 configured to connect to the third frequency converter 51, a high power amplifier 53 linked with the output end of the automatic gain controller 52, and a transmitting antenna 54 taking over the signal from the high power amplifier 53 and transmitting it.

It is preferable that the third frequency converter 51 of the signal transmitting unit 50 is configured to be linked with the local oscillator as in the first frequency converter 21a and the second frequency converter 21b of the demodulating unit 20, thereby making it possible to increase the accuracy at the time of converting the frequency.

Herein, the third frequency converter 51 is configured in to up-convert the frequency of the original signal modulated by the DA converter 42 into the predetermined band.

Further, the high power amplifier 53 is to finally amplify the converted regenerative transmission signal.

With the co-channel feedback signal cancelling regenerative repeater of the ATSC according to the present invention, the feedback signal can be effectively cancelled to improve the quality of the repeating broadcast, satisfying the broadcasting standards, and increasing stability during operation.

Further, the co-channel feedback signal cancelling regenerative repeater of the ATSC according to the present invention creates an economical environment such as by reducing the maintenance costs of the system as a whole while preventing a failure due to oscillation, such that the operating efficiency of frequency can be improved during the repeating by controlling the output of the regenerative transmission signal.

Although the co-channel feedback signal cancelling regenerative repeater of the ATSC according to the present invention is described with reference to the exemplary embodiment, it is to be understood that the invention is not limited to the disclosed embodiments, but, on the contrary, is intended to cover various modifications and equivalent arrangements included within the spirit and scope of the appended claims.

What is claimed is:

1. A co-channel feedback signal cancelling regenerative repeater of the Advanced Television Systems Committee (ATSC), comprising:
   a signal receiving unit;
   a signal demodulating unit that converts frequency of a received signal and demodulates it into a baseband signal;
   an interference equalizing unit that corrects characteristics of the demodulated signal and cancels feedback signal;
   a channel equalizing unit that compensates for channel distortion of an original signal from which the feedback signal is cancelled;
   a modulating unit that modulates the distortion-compensated original signal and converts it into an analog signal; and
   a signal transmitting unit that converts the frequency of the modulated signal, controls and amplifies its gain, and transmits a regenerative transmission signal,
   wherein the signal demodulating unit is configured to include a coupling that hands over the regenerative transmission signal of the signal transmitting unit separately from a system linked with the signal receiving unit, thereby making it possible to convert and demodulate the frequency of the regenerative transmission signal,
   wherein the interference equalizing unit comprises:
   a first sampling time control unit and a second sampling time control unit that are provided to correspond to the received signal and the regenerative transmission signal, respectively, that are handed over from the signal demodulating unit and samples the received signal and the regenerative transmission signal by applying timing control variables;
   a first matching filter and a second matching filter that are linked with the first sampling time control unit and the second sampling time control unit, respectively, and extracts the received signal and the regenerative transmission signal from the baseband signal;
   a first DC (direct current) remover and a second DC direct current remover that are connected with output ends of the first matching filter and the second matching filter, respectively, and that eliminate pilots of the received signal and the regenerative transmission signal;
   a first adaptive filter that hands over the regenerative transmission signal from which the pilot is eliminated through the first DC (direct current) remover and the second DC (direct current) remover and takes over the magnitude and phase parameter of the feedback signal according to the regenerative transmission signal from which the pilot is eliminated, thereby cancelling the feedback signal among the received signals from which the pilot is eliminated;
   a feedback signal estimator that takes over the regenerative transmission signal from which the pilot is eliminated by the first adaptive filter and estimates the magnitude and phase parameter of the feedback signal;
   a first signal magnitude adjuster that takes over the original signal remaining by cancelling the feedback signal among the received signals from which the pilot is eliminated by the first adaptive filter and corrects a symbol magnitude of the original signal;
   a timing synchronizer that extracts the timing control variables from the original signal output from the first signal magnitude adjuster and hands them over to the first sampling time control unit and the second sampling time control unit, respectively;
   a second adaptive filter that takes over the received signal and the regenerative transmission signal extracted from the first matching filter and the second matching filter and takes over the magnitude and phase parameter of the feedback signal estimated from the feedback signal estimator to cancel the feedback signal from the received signal from which the pilot is not eliminated, thereby extracting the original signal in the state where the pilot is not eliminated;
   a second signal magnitude adjuster that takes over the original signal in the state where the pilot is not eliminated by the second adaptive filter and corrects the symbol magnitude of the original signal; and
   a frequency synthesizer that is configured to extract frequency control variables of a carrier from the symbol magnitude of the original signal that is corrected by the second signal magnitude adjuster and to apply them to the received signal and the regenerative transmission signal, respectively, that are handed over from the signal demodulating unit; and
   wherein the interference equalizing unit is configured to estimate a reference value of feedback signal from the demodulated regenerative transmission signal, thereby making it possible to cancel the feedback signal among the received signals.

2. The co-channel feedback signal cancelling regenerative repeater of the ATSC of claim 1, wherein the modulator is configured to be able to apply the timing control variables and the frequency control variables extracted from the timing synchronizer and the frequency synthesizer to the regenerative transmission signal, thereby making it possible to perform inverse-compensation on the regenerative transmission signal.

3. The co-channel feedback signal cancelling regenerative repeater of the ATSC of claim 1, wherein a first frequency converter and a second frequency converter of the signal demodulating unit and a third frequency converter of the signal transmitting unit are configured to connect with a local oscillator.

4. The co-channel feedback signal cancelling regenerative repeater of the ATSC of claim 1, wherein the interference equalizing unit comprises:

a first matching filter and a second matching filter that are provided to correspond to the received signal and the regenerative transmission signal, respectively, that are handed over from the demodulating unit, and extracts the received signal and the regenerative transmission signal from the baseband signal;

a first DC (direct current) remover and a second DC (direct current) remover that are connected with output ends of the first matching filter and the second matching filter, respectively, and that eliminate pilots of the received signal and the regenerative transmission signal;

a first adaptive filter that hands over the regenerative transmission signal from which the pilot is eliminated through the first DC (direct current) remover and the second DC (direct current) remover and takes over the magnitude and phase parameter of the feedback signal according to the regenerative transmission signal from which the pilot is eliminated, thereby cancelling the feedback signal among the received signals from which the pilot is eliminated;

a feedback signal estimator that takes over the regenerative transmission signal from which the pilot is eliminated by the first adaptive filter and estimates the magnitude and phase parameter of the feedback signal;

a first signal magnitude adjuster that takes over the original signal remaining by cancelling the feedback signal among the received signals from which the pilot is eliminated by the first adaptive filter and corrects a symbol magnitude of the original signal;

a timing synchronizer that extracts the timing control variables from the original signal output from the first signal magnitude adjuster and hands them over to the first sampling time control unit and the second sampling time control unit;

a second adaptive filter that takes over the received signal and the regenerative transmission signal extracted from the first matching filter and the second matching filter and takes over the magnitude and phase parameter of the feedback signal estimated from the feedback signal estimator to cancel the feedback signal from the received signal from which the pilot is not eliminated, thereby extracting the original signal in the state where the pilot is not eliminated;

a second signal magnitude adjuster that takes over the original signal in the state where the pilot is not eliminated by the second adaptive filter and corrects the symbol magnitude of the original signal; and a frequency synthesizer that is configured to extract frequency control variables of a carrier from the symbol magnitude of the original signal corrected by the second signal magnitude adjuster and to apply them to the received signal and the regenerative transmission signal, respectively, that are handed over from the signal demodulating unit, wherein the timing synchronizer is linked with a VCXO (Voltage Controlled Crystal Oscillator) machine that controls the sampling by voltage so that the timing control variables can be applied to a first AD converter and a second AD converter of the signal demodulating unit, respectively.

5. The co-channel feedback signal cancelling regenerative repeater of the ATSC of claim 4, wherein the modulator is configured to be able to apply the timing control variables and the frequency control variables extracted from the timing synchronizer and the frequency synchronizer to the regenerative transmission signal, thereby making it possible to perform inverse-compensation on the regenerative transmission signal.

6. The co-channel feedback signal cancelling regenerative repeater of the ATSC of claim 4, wherein a first frequency converter and a second frequency converter of the signal demodulating unit and a third frequency converter of the signal transmitting unit are configured to connect with a local oscillator.

7. The co-channel feedback signal cancelling regenerative repeater of the ATSC of claim 1, wherein a first frequency converter and a second frequency converter of the signal demodulating unit and a third frequency converter of the signal transmitting unit are configured to connect with a local oscillator.

* * * * *

UNITED STATES PATENT AND TRADEMARK OFFICE
CERTIFICATE OF CORRECTION

PATENT NO. : 8,446,936 B2  Page 1 of 1
APPLICATION NO. : 12/733691
DATED : May 21, 2013
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 464 days.

Signed and Sealed this
Eighth Day of September, 2015

Michelle K. Lee
*Director of the United States Patent and Trademark Office*